United States Patent [19]
Wigness

[11] Patent Number: 5,135,343
[45] Date of Patent: Aug. 4, 1992

[54] METHOD AND APPARATUS FOR HANDLING BALES

[76] Inventor: Myron O. Wigness, Box 14, S0N 0B0, Admiral, Saskatchewan, Canada

[21] Appl. No.: 377,616

[22] Filed: Jul. 10, 1989

[30] Foreign Application Priority Data

Jun. 27, 1989 [CA] Canada ................... 604046

[51] Int. Cl.⁵ .............................................. B60P 1/04
[52] U.S. Cl. ..................................... 414/24.5; 294/61; 294/120; 414/24.6; 414/786
[58] Field of Search ............................ 242/86.5 R, 94; 294/5.5, 61, 67.5, 81.1, 81.3, 120, 122, 123, 125, 126; 414/24.5, 24.6; 786/911

[56] References Cited

U.S. PATENT DOCUMENTS

| | | | |
|---|---|---|---|
| 3,861,616 | 1/1975 | Dubberke | 414/24.6 |
| 3,944,095 | 3/1976 | Brown | 414/24.5 |
| 4,082,192 | 4/1978 | Cox | 414/24.6 |
| 4,341,411 | 7/1982 | Edwards | 414/24.5 X |
| 4,564,325 | 1/1986 | Ackerman | 414/24.5 |
| 4,579,497 | 4/1986 | Nine | 414/24.5 |
| 4,594,041 | 6/1986 | Hostetler | 414/24.5 |
| 4,722,651 | 2/1988 | Antal | 414/24.5 |
| 5,074,734 | 12/1991 | Price et al. | 294/120 X |

FOREIGN PATENT DOCUMENTS

| | | | |
|---|---|---|---|
| 1010415 | 5/1977 | Canada. | |
| 1062668 | 9/1979 | Canada. | |
| 1063559 | 10/1979 | Canada. | |
| 1195295 | 10/1985 | Canada. | |
| 2541073 | 8/1984 | France | 414/24.6 |

Primary Examiner—Robert J. Spar
Assistant Examiner—Janice Krizek

[57] ABSTRACT

An article handling device for attachment to the rear of a pickup truck including a rigid main frame having arms separated by a cross member and all lying in substantially the same plane. The cross member has rigidly attached at approximately 90 degrees thereto a leverage pole to rotate the main frame when it is hingedly supported on a bumper mounting base. A floating spear type axle for retaining an article on the main frame is attached thereto near the outer end of each arm by a flexible movement limiting tether. The floating axle when penetrating and thereby retaining an article such as a round bale allows the bale to shift downwardly and rest on the main frame preventing transit damage especially to loosely packed or soft core bales.

14 Claims, 2 Drawing Sheets

METHOD AND APPARATUS FOR HANDLING BALES

BACKGROUND OF THE INVENTION

This invention relates to article handling devices and in particular but not by way of limitation to a device to be mounted on a pickup truck for handling round bales of hay.

The handling and storage of hay at one time was by the pitch fork and haystack. This method gave way to compressing the hay into rectangular bales which were piled in blocks after using elevating means. More recently the large round bales of hay have gained favour especially in the ranching and feed lot industry.

In view of the competitive nature of most industries today several devices evolved to cope with the problems involved in handling the new larger bales. The closest related prior art known to applicant are Canadian Patents 1,010,415, 1,063,559, 1,062,668, 1,195,295 and U.S. Pat. Nos. 4,722,651, 4,594,041, 4,579,497 and 4,564,325.

The above prior art devices while providing equipment that meets the needs of some, are, due to their complicated structure, far too expensive, require considerable assembly time and often are damaging to the bales.

SUMMARY OF THE INVENTION

The present invention in order to overcome the above mentioned deficiencies has as its main objective the provision of an inexpensive, structurally simple bale handler by using an arrangement that mounts on and dismounts from a vehicle in a matter of seconds with no tools required, and provides for a limited shifting of the bale by a floating spear type bale axle to a supported position on the bale handler frame thereby avoiding damage to the bales especially those of the loosely packed or soft core type.

The present invention further provides a structure that can be operated by a simple mechanical or electrical winch means.

The present invention further provides a rectangular frame for handling or transporting many miscellaneous articles when not in use as a bale handler.

The present invention further provides a structure suitable for the "roll-out" of bales for feeding purposes.

The present invention further provides an article handling means comprising a main frame means for supporting an article or articles and defining a plane surface, article retaining means fastened to said main frame with provision for limited free translational movement relative thereto while in operation, leverage means fixedly mounted to said main frame means and mounting means pivotally supporting said main frame means whereby movement of the leverage means pivots the main frame means with retaining means to an overcenter position about the mounting means thereby moving articles to a supported and locked position.

A further provision of the instant invention is the method of handling a cylindrical bale having a horizontal axis comprising the steps of: securing a lift mechanism to a bale, pivoting the lift mechanism and bale to a position overcenter of the pivoting axis, providing for a downward limited movement of the securing means enabling support of the bale on the mechanism, transporting the mechanism with bale to a new location, releasing the mechanism from the overcenter locking position, lowering the bale, untying the bale and by movement of the transporting vehicle unrolling the bale on the ground.

Other objects and provisions and a further understanding of the instant invention may be had by referring to the following description and claims, taken in conjunction with the accompanying drawings, in which:

PREFERRED EMBODIMENT

Figure 1:
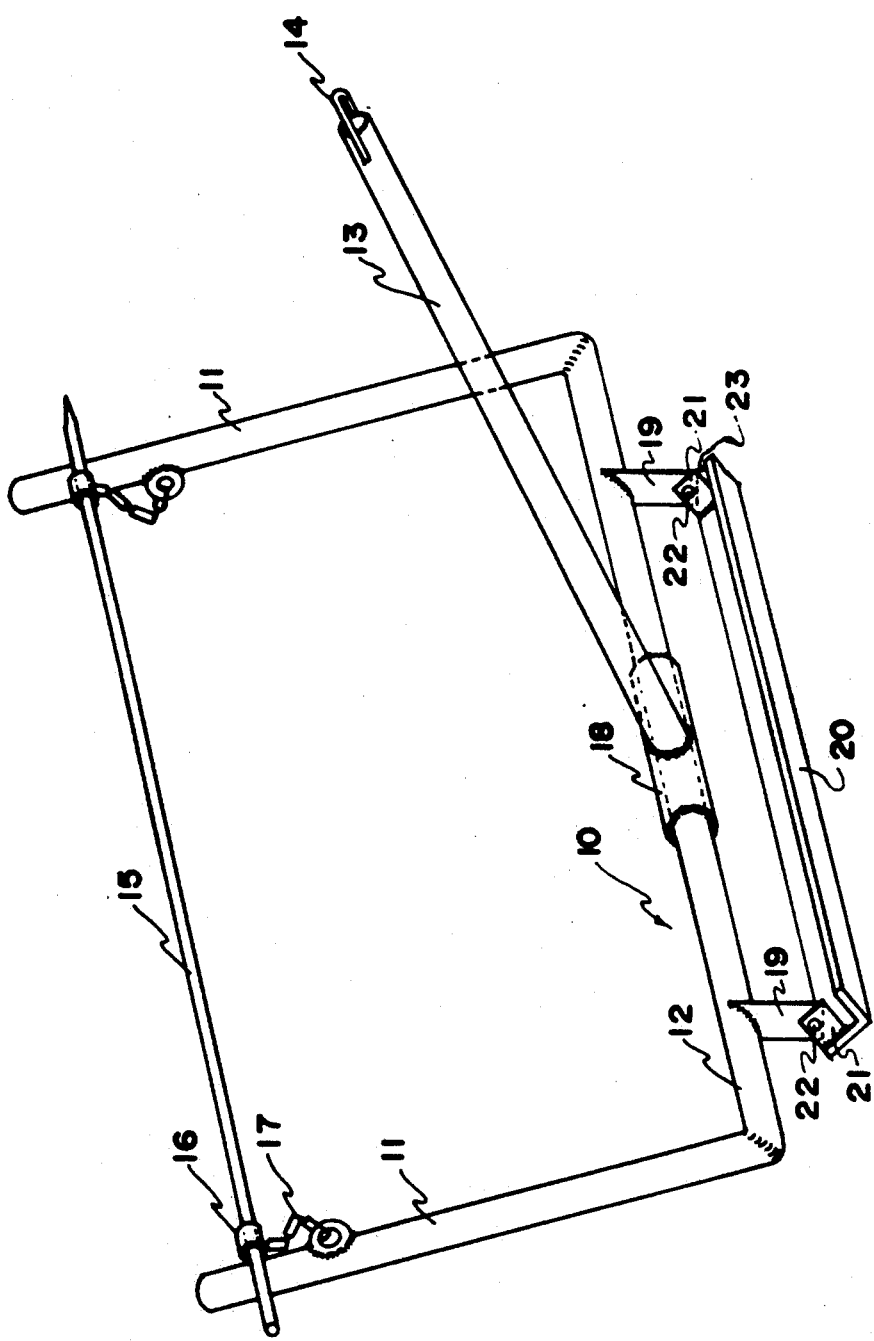
FIG. 1 is a perspective view of the instant invention.

Referring now to the drawings, there is shown in FIG. 1 a main frame generally designated by the numeral 10. This main frame is formed by two arms, 11 integrally joined by a cross member 12, the resultant structure lying in a single plane. A cross member reinforcing sleeve 18 is placed over the cross member centrally thereof and rigidly fixed thereto. Cross member tabs 19 are fixed to cross member 12 at a position that is slightly downwardly from the plane represented by the main frame. This out of plane location assists in an overcenter locking position of the main frame when pivoted as shown in FIG. 3. Mounting base tabs 21 are hingedly fastened to the cross member tabs 19 by hinge pins 22 and are rigidly fixed to the mounting base 20. The hinge pins 22 are off center to assist in the overcenter locking effect. The base tabs 21 are fixed to the base 20, which is preferably a sturdy 4"×3" angle iron, at a location which provides a space or gap 23 at both ends to receive a mounting chain 28 shown in FIGS. 2 and 3. The mounting chain 28 lays along the throat of the angle iron base 20 then passes through the space 23 and is hooked at each end to a suitable location on the vehicle and tightened by a turnbuckle or "boomer". A boomer is an overcenter lever arrangement fastened to a chain and is commonly used on large flat bed trucks to secure a load. The boomer fastening device is used to provide a rapid fastening of the mounting base 20 to the vehicle where the top of the rear bumper 27 and truck box 29 form a complimentary right angle to accept the mounting base 20.

Near the free ends of each arm 11 is a bale axle retaining collar 16 attached to each arm by flexible means usually in the form of a chain 17. The bale axle retaining collars 16 hold the spear type bale axle 15 to the arms 11 by the flexible means 17 enabling a round bale pierced along its central axis by the bale axle 15 to move outwardly but within the outer limits of the arms 11 and inwardly sufficient to permit the bale to rest on the main frame 10 where the bale has been pivoted to its transporting location as shown in FIG. 3. This floating of the bale axle 15 permitting transporting support of the bale by the main frame 10 is very important since it eliminates damage to poorly pressed or soft core bales.

Leverage pole 13 is rigidly attached to the cross member reinforcing sleeve 18. The sleeve 18 is only for added strength in the event the bales are extremely heavy or stuck to the ground. The leverage pole 13 is located centrally of the cross member 12 and forms an approximate right angle with the plane of the main frame 10. The leverage pole 13 has at its outward end a pivot force mounting means 14 which is engaged by a hand crank winch 25 or electric tension producing device as desired.

Figure 2:
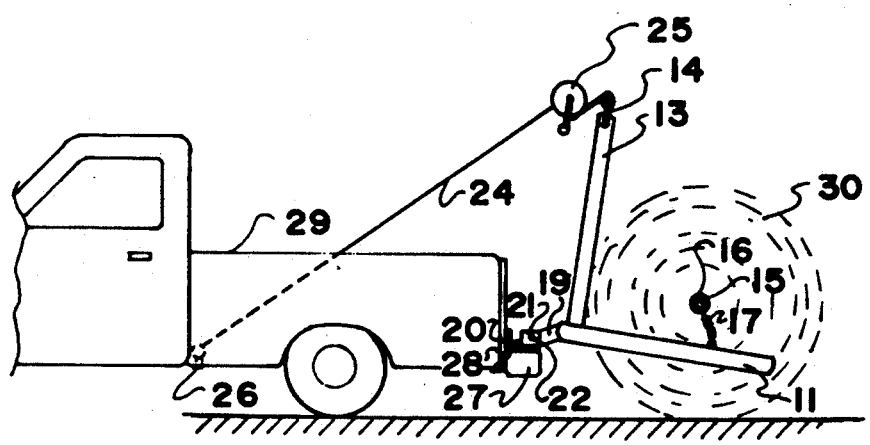
FIG. 2 is a side elevation view of the instant invention mounted on the rear of a vehicle and in the bale engaging position.
Figure 3:
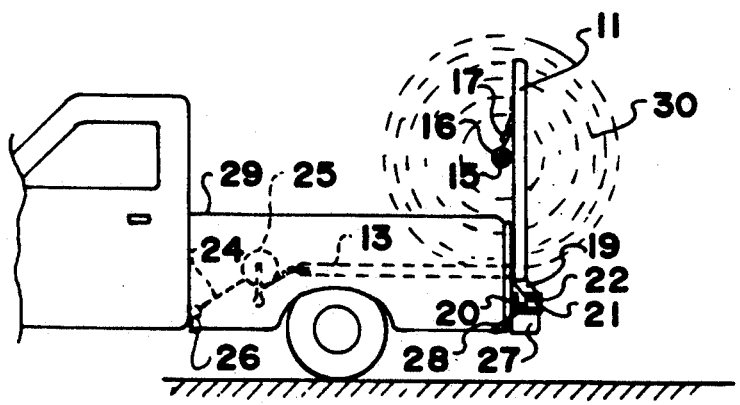
FIG. 3 is a side elevation view of the instant invention mounted on the rear of a vehicle showing the bale in the supported and overcenter locked position.

In FIG. 2 the bale handler is seen attached to the rear of the vehicle, the mounting base 20 resting on the top of the vehicle bumper 27 and against the vehicle box 29. The mounting base is firmly attached by a chain 28 fastened to a suitable location under the bumper and snugged tight by a device such as an overcenter lever or "boomer" as previously described. In operation the vehicle is backed up to a bale, the spear type bale axle 15 is inserted through a bale axle retaining collar 16 then forced through the bale at its central axis then inserted through the other collar 16. The bale is now floatingly retained by chains 17 on arms 11. To raise the bale to transporting position a tension producing device such as a hand winch 25 is hooked to pivot force mounting means 14 normally welded to leverage pole 13. The winch is now operated shortening the winch cable 24 which is anchored to a vehicle body member 26 near the front of the vehicle box 29.

In FIG. 3 the bale handler has been pivoted to its transporting position. The center of gravity of the bale at bale axle means 15 is now over center of its pivoting axis which are hinge pins 22 locking it in position while the floating bale axle 15 has let the bale move downwardly to rest on the main frame 10 thereby avoiding bale damage especially to lose or soft core bales supported only by shaft piercing means.

For feeding of stock the bale is controllably released to its ground engaging position, the restraining cords are cut, the vehicle moves ahead and the bale unrolls. No special spinners are required.

Although the invention has been described with a certain degree of particularity, it is understood that the present disclosure has been made only by way of example and that numerous changes in the details of construction may be resorted to without departing from the spirit and scope of the invention as hereinafter claimed.

The embodiments of the invention in which an exclusive property or privilege is claimed is defined as follows:

1. A bale handling device for use on a vehicle comprising in combination, a main frame comprising arms and an integrally joined cross member separating the arms all lying in substantially the same plane, bale penetrating axle means for passing through the bale along its central axis, said bale penetrating axle means being flexibly and releasably connected to the main frame arms to permit limited translational movement relative thereto, leverage means rigidly attached to said cross member, and vehicle mounting means pivotally supporting said main frame, whereby movement of the leverage means when pivoting the arms to a substantially vertical position allows downward movement of a mounted bale to a supported position on the main frame for damage free transportation by the vehicle.

2. Apparatus for handling round hay bales comprising in combination, a base for mounting the apparatus on a vehicle, a main frame having arms and a cross member separating but integrally uniting said arms all in substantially the same plane, pivot means pivotally supporting the main frame on the base, bale retaining means, mounting means releasably tethering for limited translational movement said bale retaining means to said arms, leverage means rigidly fastened to said cross member to transfer a pivoting force to the main frame for pivot handling of the bale.

3. Apparatus as claimed in claim 2 wherein the pivot means is in the form of a hinge whereby a force applied to a free end of the leverage means can pivotally relocate the bale to various desired positions, one such position restraining the bale but allowing it to rest on the main frame which is the transporting position.

4. A method of handling round hay bales comprising, providing a main frame of a bale handling apparatus, providing a limited movement floating bale piercing axle releasably and flexibly mounted to the main frame, pivotally mounting the main frame to a transporting vehicle, removing the bale piercing axle, piercing the bale along its central axis, while simultaneously engaging axle mounting means thereby attaching the pierced bale to the forward side of the main frame, pivoting the main frame to a basically vertical but overcenter position whereby the overcenter position prevents normal return pivoting of the pierced bale and the floating axle allows downward movement of the pierced bale to a resting position on the main frame thereby placing the bale in a transportably secure position, transporting the bale to a desired location, pivoting the frame to a basically horizontal bale support surface engaging position, removing the bale binding cord and paying out the rolled bale on the support surface by forward movement of the transport vehicle.

5. A method as claimed in claim 4 wherein the pivoting of the main frame is by means of a winch-operated leverage pole attached thereto.

6. A method as claimed in claim 5 wherein the main frame is pivotally mounted to the vehicle by a base fastened to the vehicle, and offset tabs mounted on the frame and hinge pins connecting the base to the offset tabs.

7. Apparatus for handling round hay bales comprising in combination, a base for mounting the apparatus on a vehicle, a main frame having arms and a cross member separating but integrally uniting said arms all in substantially the same plane, pivot means pivotally supporting the main frame on the base, bale retaining means, mounting means releasably tethering for limited translational movement said bale retaining means to said arms, leverage means rigidly fastened to said cross member to transfer a pivoting force to the main frame for pivot handling of the bale and wherein the bale retaining means is in the form of a bale piercing axle for passing through the bale along its central axis.

8. Apparatus as claimed in claim 7 wherein the mounting means is in the form of axle end encircling collars with a flexible chain connecting the collars to the arms.

9. Apparatus for handling round bales comprising in combination, a base for mounting the apparatus on a vehicle, a main frame having arms and a cross member separating but integrally uniting said arms all in substantially the same plane, pivot means pivotally supporting the main frame on the base, bale retaining means, mounting means releasably tethering for limited translational movement said bale retaining means to said arms, leverage means rigidly fastened to said cross member to transfer a pivoting force to the main frame for pivot handling of the bale and wherein the base is in the form of a right angled iron, the main frame arms and cross member are formed of tubular pipe integrally attached at their points of contact in the shape of a "U", the pivot means is formed by tabs integrally attached to the cross member and offset from the plane of the main frame, and cooperating tabs integrally attached to the base and being joined to the cross member tabs in cooperative relationship by offset hinge pins, the bale retaining means is in the form of a bale piercing axle, said mounting means is formed by encircling collars at each end of the axle and connected by flexible means to the arms and wherein the leverage means is a pole rigidly attached to the cross member at one of its ends, and adapted to receive force applying means at the other.

10. Apparatus as claimed in claim 9 further including a pivot force applying means having cable means anchorable to the vehicle and a body to be received by the pole of the leverage means, whereby when the cable means is retracted the main frame with loaded bale can be moved to various desirable positions, the most desirous being the transport position with the arms in substantially vertical overcenter locked position and with the bale enabled to rest upon the main frame but remain constrained due to the bale retaining means.

11. The apparatus as claimed in claim 10 wherein the pivot force applying means is in the form of a hand winch.

12. The apparatus as claimed in claim 10 wherein the pivot force applying means is in the form of an electric motor driven winch.

13. Apparatus as claimed in claim 7 wherein the pivot means is in the form of a hinge whereby a force applied to a free end of the leverage means can pivotally relocate the bale to various desired positions, one such position restraining the bale but allowing it to rest on the main frame which is the transport position.

14. Apparatus as claimed in claim 8 wherein the pivot means is in the form of a hinge whereby a force applied to a free end of the leverage means can pivotally relocate the bale to various desired positions.

* * * * *